United States Patent [19]
Roney, IV

[11] Patent Number: 5,406,562
[45] Date of Patent: Apr. 11, 1995

[54] BIT ERROR RATE ESTIMATION

[75] Inventor: Edward M. Roney, IV, Grayslake, Ill.

[73] Assignee: Motorola, Inc., Schaumburg, Ill.

[21] Appl. No.: 26,656

[22] Filed: Mar. 5, 1993

[51] Int. Cl.6 .............................................. H04L 7/00
[52] U.S. Cl. ...................................... 371/5.1; 371/5.3;
371/28
[58] Field of Search ...................... 371/5.1, 5.5, 25.1,
371/28, 43, 44, 67.1; 375/94, 95, 102

[56]  References Cited
U.S. PATENT DOCUMENTS 5,260,951  11/1993  Watanabe .............................. 371/5.1

Primary Examiner—Vincent P. Canney
Attorney, Agent, or Firm—Kevin D. Kaschke

[57]  ABSTRACT

The bit error rate (BER) estimation process of the present invention receives encoded data over a channel, decodes the data, and estimates the number of errors induced by the channel. The process of the present invention requires reduced processing time by the processor thereby reducing the power requirements of the processor.

9 Claims, 3 Drawing Sheets

BIT ERROR RATE ESTIMATION

FIELD OF THE INVENTION

The present invention relates generally to the field of communications and particularly to bit error rate estimation of a communication channel.

BACKGROUND OF THE INVENTION

As communication devices become more complex, they typically have larger power requirements. This, in part, is due to complex software requiring the processor to operate for long periods of time and/or at a higher clock rate. Both conditions causing the processor to draw more current. In a portable, battery powered device, this depletes the battery's power quicker.

The processor in a communication device such as a radiotelephone performs processes to generate the bit error rate (BER) of user information and control signals transmitted from the base station. The EIA/TIA specification uses user information to denote the speech parameters generated by the vocoder. The BER can be used by the processor to mute audio, as a display indication, FACCH or user information determination, and channel quality estimation.

The control signals are transmitted over a control channel that is referred to in the art as a Fast Associated Control Channel (FACCH). This channel is a blank-and-burst channel for signalling message exchange between the base station and the mobile station.

FACCH decoding is performed before user information decoding. This is due to the lack of robustness in the cyclic redundancy check (CRC) performed after user information decoding to determine the validity of the user information; FACCH data will be mistaken for user information, thus losing the FACCH message.

FACCH and user information convolutionally encoded data share the same location during transmission, therefore only one message type can be present at any one time. Because user information convolutionally encoded data is transmitted more frequently than FACCH convolutionally encoded data, the execution of the FACCH decoding algorithms before the user information decoding algorithms becomes wasteful of instruction cycles and thus current drain. It is unknown whether a FACCH message or user information is going to be received. Therefore, both must be checked using million instructions per second (MIPS) exhaustive algorithms.

As discussed above, the BER estimation process is an important one that requires a large number of MIPS. Reducing this requirement would reduce the current requirement of the processor in addition to freeing the processor to do other tasks. There is a resulting need for a process to estimate the BER of a signal using a minimum amount of processor time.

SUMMARY OF THE INVENTION

The present invention encompasses a process for estimating a bit error rate of a received signal that has been convolutionally encoded by a first transfer function. The process generates a first output signal in response to the received signal being run through a second transfer function that is an inverse of the first transfer function. The process also generates a second output signal in response to the received signal being run through a third transfer function. The third transfer function is an inverse of the first transfer function and distinct from the second transfer function. The two output signals are logically combined to produce an error signal comprising error data. This error signal is then used to estimate the bit error rate.

DETAILED DESCRIPTION OF THE PREFERRED EMBODIMENT

Figure 1:
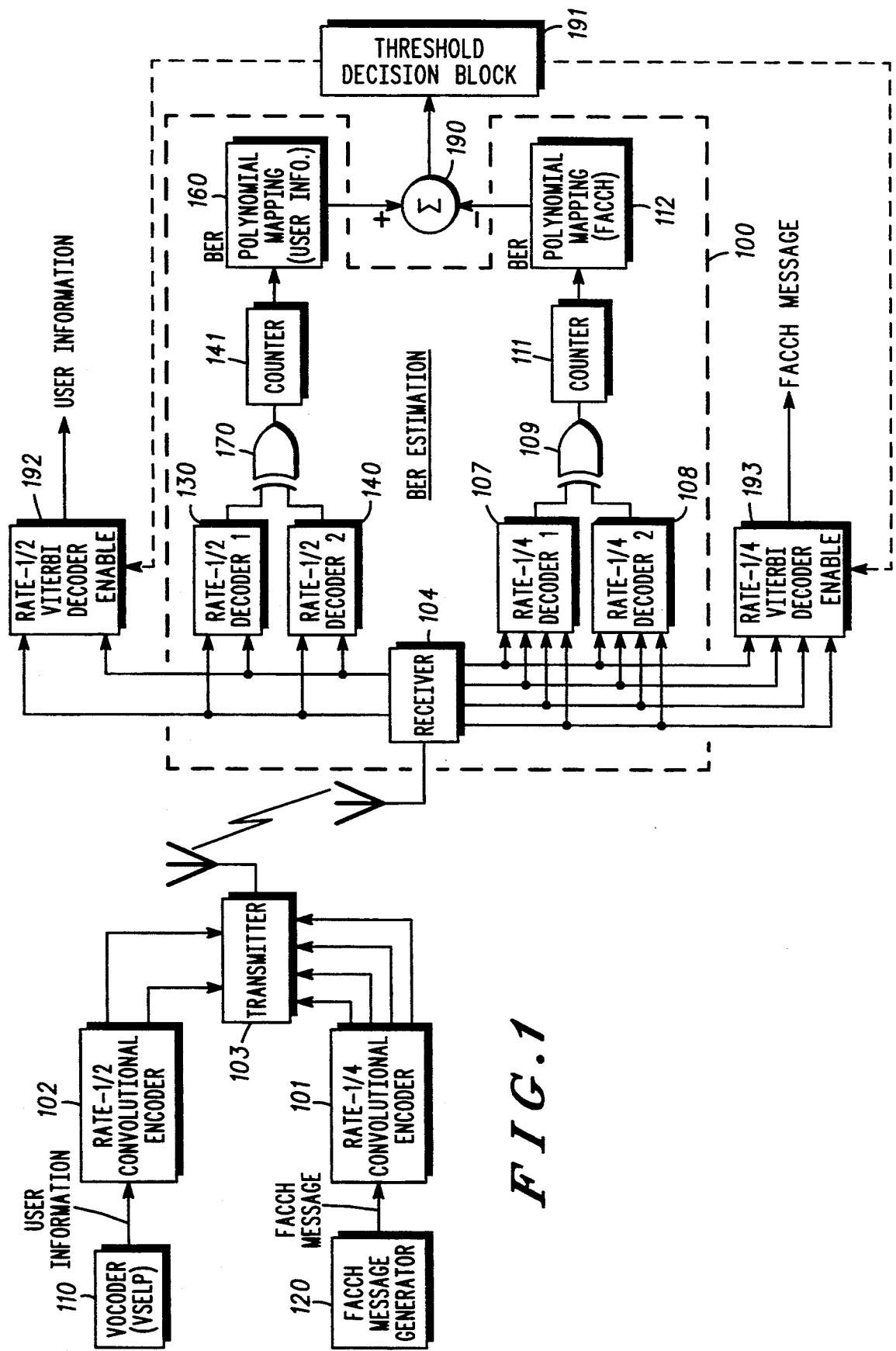
FIG. 1 shows a block diagram of the process of the present invention.

A block diagram of the BER estimation process of the present invention (100) is illustrated in FIG. 1. FIG. 1 additionally illustrates the system of which the BER estimation process (100) is a part.

Referring to FIG. 1, the system is comprised of two paths: a user information path and a FACCH message path. The user information that, in the preferred embodiment, are speech parameters determined and encoded by the speech coder (110) using a code excited linear predictive coding technique. In the preferred embodiment, this technique is referred to as vector-sum excited linear predictive (VSELP) coding. A technical description of this technique, *Vector Sum Excited Linear Prediction 13000 Bit Per Second Voice Coding Algorithm Including Error Control for Digital Cellular*, is published by and available from Motorola Inc.

The baseband user information is then run through a rate-$\frac{1}{2}$ convolutional encoder (102). This encoder is comprised of generator polynomials that add redundancy to the speech data for error correction purposes. The generator polynomials are as follows:

$$g_0(D) = 1 + D + D^3 + D^5$$

$$g_1(D) = 1 + D^2 + D^3 + D^4 + D^5$$

These equations are referenced in Interim Standard-54 (Rev. A) from the Electronic Industries Association.

'D' represents the delay operator, the power of 'D' denoting the number of time units a bit is delayed with respect to the initial bit in the sequence. This notation is defined by Shu Lin and Daniel Costello in *Error Control Coding: Fundamentals and Applications*, (1983), p. 330.

The outputs from the rate-$\frac{1}{2}$ convolutional encoder (102) are input to a transmitter (103) for transmission over the channel. FACCH and user information cannot be sent simultaneously. The FACCH message replaces the user information whenever system considerations deem it appropriate. The signal is received by a receiver (104) and the convolutionally encoded user information is input to the BER estimation process of the present invention (100).

The received convolutionally encoded user information is input to two separate and distinct rate-$\frac{1}{2}$ decoders (130 and 140) containing polynomials that are the inverses of the generator polynomials used in the rate-$\frac{1}{2}$ convolutional encoding transfer function. The outputs of these decoders (130 and 140) will be an estimate of the original data before rate-$\frac{1}{2}$ convolutional encoding.

By using two separate and distinct decoders representing the inverse of the original encoder, the decoder outputs, when errors are induced, will also be distinct. The polynomials used in the first rate-$\frac{1}{2}$ decoder (130) are:

$h_0(D) = 1 + D^1 + D^4$ $h_1(D) = D^2 + D^3 + D^4$

Figure 2:
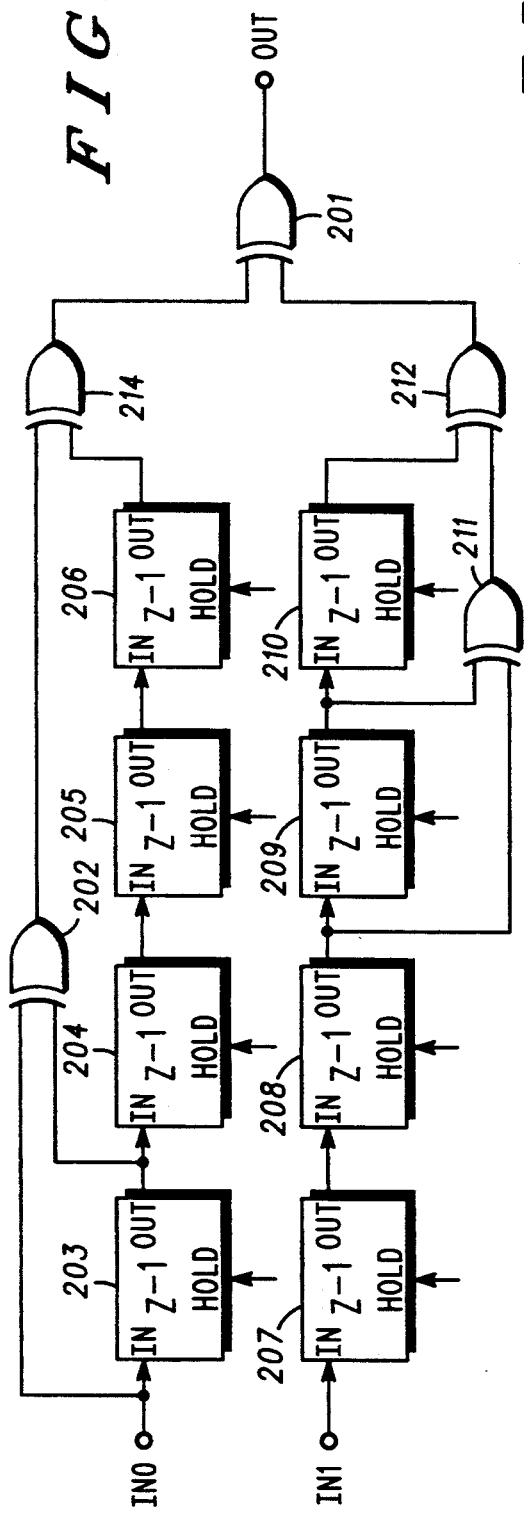
FIG. 2 shows a block diagram of a first rate-$\frac{1}{2}$ decoder.

The first decoder (130) is illustrated in FIG. 2. This decoder (130) is comprised of two input paths that are XORed (201) to generate the output data. The first input path XORs (202) one of the input signals with the same input signal delayed by one unit of delay (203). The output of this XOR operation (202) is itself XORed (214) with this first input delayed by four units of delay (203–206). The second input path first XORs (211) the second input signal delay with two units of delay (207 and 208) with the same input signal delayed by three units of delay (207–209). The output of this XOR operation (211) is then XORed (212) with the second input signal delayed by four units of delay (207–210).

Figure 3:
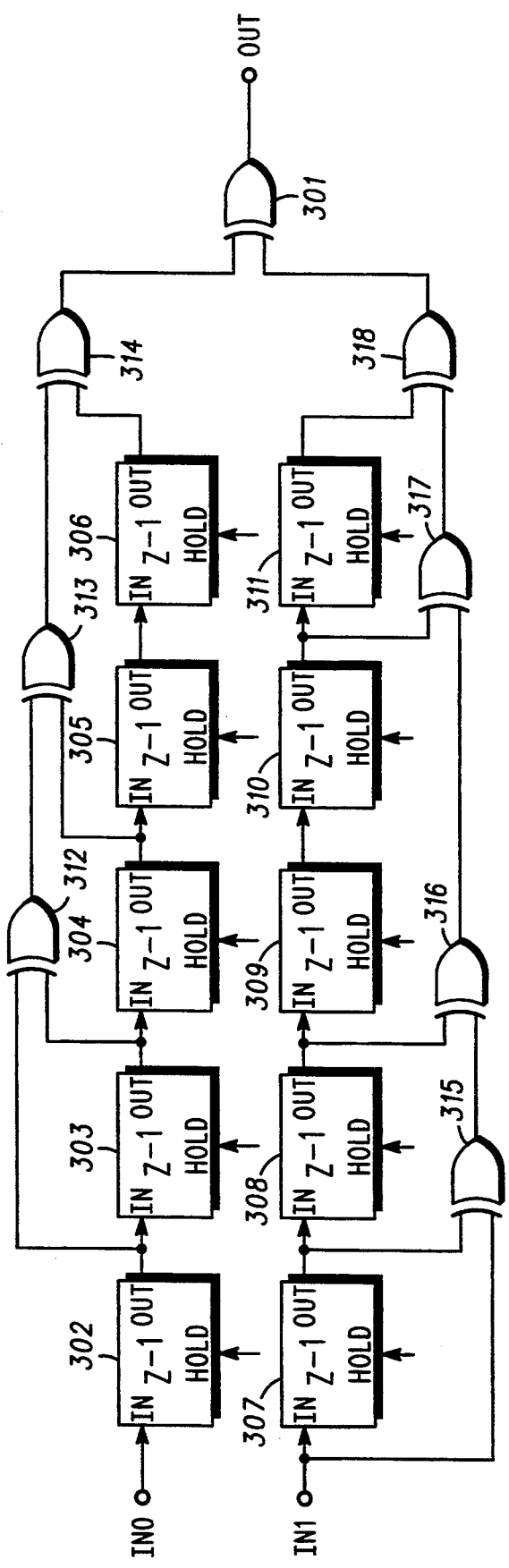
FIG. 3 shows a block diagram of a second rate-$\frac{1}{2}$ decoder.

The second rate-$\frac{1}{2}$ decoder (140) uses the following polynomials and is illustrated in FIG. 3:

$h_0(D) = D^1 + D^2 + D^3 + D^5$ $h_1(D) = 1 + D^1 + D^2 + D^4 + D^5$

Referring to FIG. 3, the decoder (140) is comprised of two input paths that are XORed (301) to generate the output data. The first input path XORs (312) the first input delayed by one delay unit (302) with the same input delayed by two delay units (302 and 303). The result of this XOR operation (312) is XORed (313) with the first input delayed by three delay units (302–304). The result of this XOR operation (313) is then XORed (314) with the first input signal delayed by five delay units (302–306). The second input path XORs (315) the second input signal with the second input signal delayed by one delay unit (307). The result of this XOR operation (315) is XORed (316) with the second input signal delayed by two delay units (307 and 308). The result of this operation (316) is then XORed (317) with the second input signal delayed by four delay units (307–310). This result is then XORed (318) with the second input signal delayed by five delay units (307–311).

The outputs of the rate-$\frac{1}{2}$ decoders (130 and 140) are XORed (170). This function can be accomplished by a hardware XOR gate or by a software process. This output of the XOR operation (170) produces a number of bits in error proportional to the BER of the channel.

A counter (141) keeps track of the number of errors found. The counter (141) is coupled to the output of the XOR operation. This count function can also be a hardware counter or a software process. The output of the count operation is an estimate of the number of bits in error for the user information.

The estimated BER signal is input to a polynomial mapping process (160) that normalizes the estimated BER signal to produce the actual BER of the channel. This process (160) uses a third order polynomial that was experimentally derived by curve fitting the output of the counter to the BER of the channel. This process (160) is needed because for high BER, some errors will overlap and cancel each other out during the XOR operation (170).

The process followed over the FACCH data path is similar to the above described process for the user information path; the main difference being the use of a rate-$\frac{1}{4}$ convolutional encoder to generate the baseband FACCH data signal for transmission. FIG. 1 illustrates the FACCH portion of the BER estimation process of the present invention in conjunction with the surrounding system.

The generator polynomials for the rate-$\frac{1}{4}$ convolutional encoder (101) are:

$g_0(D) = 1 + D + D^3 + D^4 + D^5$ $g_1(D) = 1 + D + D^2 + D^4 + D^5$ $g_2(D) = 1 + D + D^2 + D^3 + D^5$ $g_3(D) = 1 + D^2 + D^5$

These equations are referenced in Intorim Standard-54 (Rev. A) from the Electronic Industries Association.

Referring to FIG. 1, the FACCH data, from the FACCH message generator (120), are input to the rate-$\frac{1}{4}$ convolutional encoder (101). Redundancy is added in this step to aid in error correction. The convolutionally encoded data stream is transmitted (103) over the channel to be received by a receiver (104). The received convolutionally encoded FACCH data are then input to the BER estimation process (100) of the present invention.

The convolutionally encoded FACCH data are input to two separate and distinct rate-$\frac{1}{4}$ decoders (107 and 108), each using an inverse of the original rate-$\frac{1}{4}$ convolutional encoding transfer function. The first rate-$\frac{1}{4}$ decoder (107), illustrated in greater detail in FIG. 4, uses the following polynomials:

$h_0(D) = 1$ $h_1(D) = D^2$ $h_2(D) = 1 + D^2$ $h_3(D) = 1$

Figure 4:
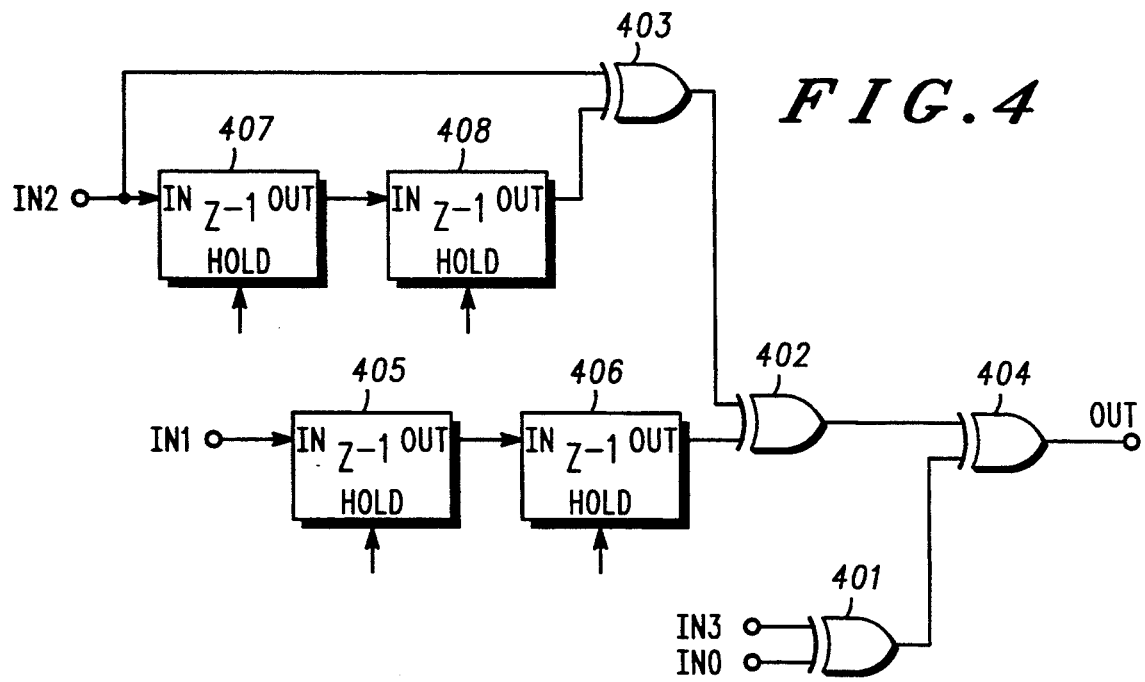
FIG. 4 shows a block diagram of a first rate-$\frac{1}{4}$ decoder.

Referring to FIG. 4, this decoder (107) XORs (403) one of the inputs with the same input delayed by two delay units (407 and 408). The result of this operation (403) is XORed (402) with a second input delayed by two delay units (405 and 406). The result of this XOR operation (402) is XORed (404) with the XOR (401) of the remaining two inputs to generate the output of the decoder (107).

Figure 5:
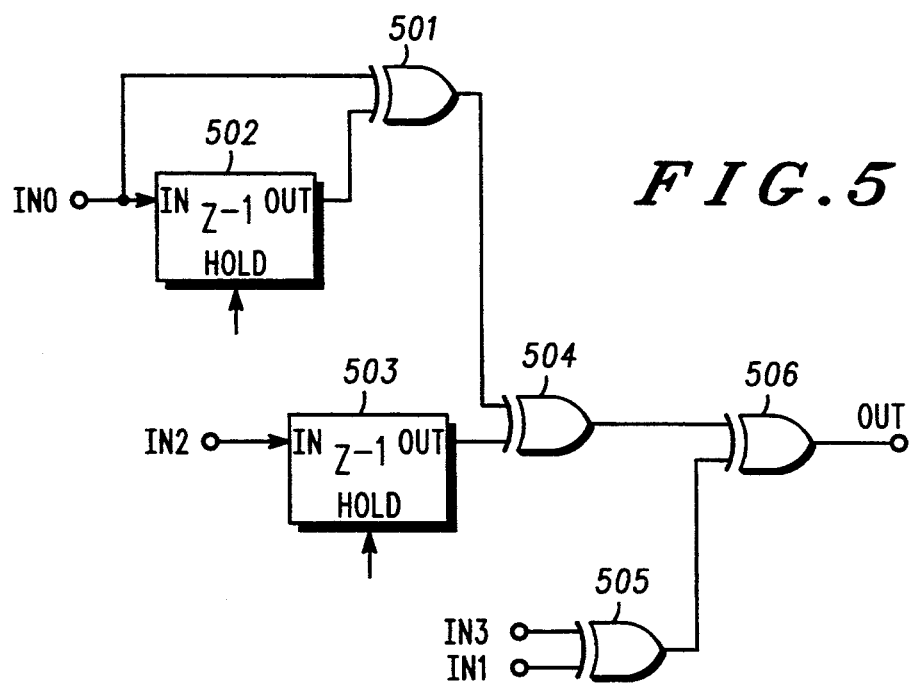
FIG. 5 shows a block diagram of a second rate-$\frac{1}{4}$ decoder.

The second rate-$\frac{1}{4}$ decoder (108), illustrated in greater detail in FIG. 5, uses the following polynomials:

$h_0(D) = 1 + D$ $h_1(D) = 1$ $h_2(D) = D$ $h_3(D) = 1$

Referring to FIG. 5, this decoder (108) XORs (501) one of the inputs with the same input delayed by one delay unit (502). The output of this XOR operation (501) is XORed (504) with a second input delayed by one delay unit (503). The result of this operation (504) is XORed (506) with the XOR (505) of the remaining two inputs to generate the output of the decoder (108).

The outputs of the rate-$\frac{1}{4}$ decoders (107 and 108) are XORed (109). This function can be accomplished by a hardware XOR gate or by a software process. This output of the XOR operation (109) produces a number of bits in error proportional to the BER of the channel.

A counter (111) keeps track of the member of errors found. The counter (111) is coupled to the output of the XOR operation (109). This count function (111) can also be a hardware counter or a software process. The output of the count operation (111) is an estimate of the number of bits in error.

The number of bits in error for the FACCH data is input to a polynomial mapping process (112) that normalizes the number of bits in error to produce the BER of the channel. This process (112) uses a third order polynomial that was derived by curve fitting the output of the counter to the BER of the channel. This mapping process (112) is needed because for high BER, some errors will overlap and cancel each other out during the XOR operation (109).

The outputs of the normalizing operations (160 and 112) are input to a summing operation (190). The estimated BER of the FACCH message is subtracted from the estimated BER of the user information. This operation is performed in order to compute the difference so as to be compared to a threshold. The estimated BER difference is then compared to a threshold (191). In the preferred embodiment, this threshold is −0.01. More priority is given to FACCH data than user information data.

If the difference is greater than or equal to the threshold, the information received by the receiver is a rate-¼ convolutionally encoded FACCH message. The rate-¼ convolutionally encoded FACCH message is sent to a rate-¼ Viterbi decoder (193) where the original FACCH message is recovered. If the difference is less than the threshold, the information received by the receiver is rate-½ convolutionally encoded user information. The rate-½ convolutionally encoded user information is sent to a rate-½ Viterbi decoder (192) where the original user information is recovered.

While the processes of the present invention, in the preferred embodiment, are implemented as software processes, they can also be implemented as hardware circuits in an alternate embodiment.

The BER estimation process of the present invention, therefore, is instrumental in making the proper decision between two data streams. While the process, in the preferred embodiment, is implemented as a software process, it can also be implemented as a hardware circuit in an alternate embodiment. This process generates an estimated BER, thus enabling the signal with the lowest BER to be chosen. This estimated BER is generated using less processor time than previous methods, thereby reducing the power requirements of the processor.

I claim:

1. A process for estimating a bit error rate of a received signal that has been encoded by a first transfer function, the process comprising the steps of:
   processing the received signal with a second transfer function to generate a first output signal;
   processing the received signal with a third transfer function distinct from the second transfer function to generate a second output signal;
   combining the first and the second output signals to produce an error signal; and
   estimating the bit error rate in response to the error signal.

2. The process of claim 1 wherein the error signal comprises error data, the process further comprising the step of counting the error data to produce an error count signal.

3. The process of claim 1 wherein the first transfer function is a rate-½ convolutional encoder.

4. The process of claim I wherein the first transfer function is a rate-¼ convolutional encoder.

5. The process of claim 2 further comprising the step of normalizing the error count signal.

6. The process of claim 1 wherein the step of combining further comprises the step of exclusive ORing the first and second output signals.

7. A communication system having a rate-½ convolutionally encoded signal and a rate-¼ convolutionally encoded signal, the rate-½ convolutionally encoded signal encoded by a first transfer function and the rate-¼ convolutionally encoded signal encoded by a second transfer function, the communication system comprising:
   means for receiving the rate-½ convolutionally encoded signal and the rate-¼ convolutionally encoded signal;
   a first convolutional decoder coupled to the means for receiving and generating a first output signal, the first convolutional decoder having a third transfer function that is an inverse of the first transfer function;
   a second convolutional decoder coupled to the means for receiving and generating a second output signal, the second convolutional decoder having a fourth transfer function that is an inverse of the first transfer function and distinct from the third transfer function;
   a third convolutional decoder coupled to the means for receiving and generating a third output signal, the third convolutional decoder having a fifth transfer function that is an inverse of the second transfer function;
   a fourth convolutional decoder coupled to the means for receiving and generating a fourth output signal, the fourth convolutional decoder having a sixth transfer function that is on inverse of the second transfer function and distinct from the fifth transfer function;
   first logical combining means for producing a first error signal in response to the first and second output signals;
   second logical combining means for producing a second error signal in response to the third and fourth output signals;
   means for counting errors in response to the first error signal to produce a first error count signal;
   means for counting errors in response to the second error signal to produce a second error count signal;
   means for normalizing the first error count signal; and
   means for normalizing the second error count signal.

8. A radiotelephone comprising:
   a receiver for receiving a signal encoded by a first transfer function to produce a received signal;
   a first decoder having a second transfer function for decoding the received signal to generate a first output signal;
   a second decoder having a third transfer function distinct from the second transfer function for decoding the received signal to generate a second output signal;
   a signal combiner for combining the first and the second output signals to produce an error signal indicative of a bit error rate of the received signal.

9. In a radiotelephone system including a base station and a radiotelephone unit, the base station transmitting a signal either encoded by a first transfer function to produce a rate-$\frac{1}{2}$ convolutionally encoded signal or encoded by a second transfer to produce a rate-$\frac{1}{4}$ convolutionally encoded signal function, the radiotelephone comprising:

a receiver for receiving the signal to produce a received signal;

a first convolutional decoder having a third transfer function that is an inverse of the first transfer function for generating a first output signal responsive to the received signal;

a second convolutional decoder having a fourth transfer function that is an inverse of the first transfer function and distinct from the third transfer function for generating a second output signal responsive to the received signal;

a third convolutional decoder having a fifth transfer function that is an inverse of the second transfer function for generating a third output signal responsive to the received signal;

a fourth convolutional decoder having a sixth transfer function that is an inverse of the second transfer function and distinct from the fifth transfer function for generating a fourth output signal responsive to the received signal;

a first logical combiner for combining the first and second output signals to produce a first error signal indicative of a first bit error rate of the received signal; and a second logical combiner for combining the third and fourth output signals to produce a second error signal indicative of a second bit error rate of the received signal,

* * * * *